2,842,598
MYRCENE-METHACROLEIN ADDUCT AND PROCESS THEREFOR

Garry C. Kitchens, Packanack Lake, N. J., assignor to The Givaudan Corporation, New York, N. Y., a corporation of New Jersey No Drawing. Application July 6, 1956
Serial No. 596,162
5 Claims. (Cl. 260—598)

This invention relates to novel materials having desirable olfactory and flavor properties, and to a process for the preparation of such materials. More especially, the present invention relates to the preparation of Diels-Alder adducts of myrcene and methacrolein and to the resulting adducts and derivatives thereof.

Myrcene is produced in commercial quantities by the pyrolysis of beta-pinene. It is a substance which occurs in various essential oils and in the dehydration products of linalool. Myrcene has the formula:

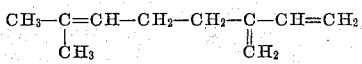

Methacrolein is used as a raw material in making certain resinous materials. It has the formula:

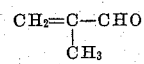

In general, in preparing the novel myrcene-methacrolein adduct, the diene, myrcene, is reacted with the dienophile, methacrolein, according to the well known Diels-Alder reaction. The adduct is a mixture of two structural isomers which are possible when an unsymmetrical diene such as myrcene and an unsymmetrical dienophile such as methacrolein interact by the addition of the ethylene double bond of the dienophile to the 1,3 conjugated bonds of the diene. For the purpose of designation the adduct is referred to in this invention as 1 - methyl - 4- (4 - methyl - 3 - pentenyl)-1,2,3,6-tetrahydrobenzaldehyde and 1-methyl-3-(4-methyl-3-pentyl)-1,2,5,6-tetrahydrobenzaldehyde and the corresponding hydrogenated adduct as 1-methyl-4-isohexylhexahydrobenzaldehyde and 1-methyl-3-isohexylhexahydrobenzaldehyde.

In general, in preparing the novel myrcene-methacrolein adduct these reactants are heated together between a temperature of 90°–160° C. until the reaction is complete requiring 4 to 30 hours depending on the temperature used. To avoid the use of pressure equipment I prefer to begin the reaction at the atmospheric reflux temperature of the mixture (90° C.) and allow the temperature to rise to 140° C. as the reaction proceeds and the boiling point of the mixture increases.

The reaction temperature is not critical. However, the time to complete the reaction is a function of the temperature and requires from 4 hours at 160° C. to 30 hours at reflux temperature.

The saturated aldehyde formed by the hydrogenation of the olefinic unsaturated bonds of the myrcene-methacrolein adduct has been found to possess unusual odor properties. It has been found that this aldehyde can be produced either by selective hydrogenation of the adduct using a catalyst selective for olefinic unsaturated bonds or by protecting the aldehyde group by first forming an acetal followed by hydrogenation to the saturated acetal and regenerating the aldehyde by acid hydrolysis.

The myrcene-methacrolein adduct can be hydrogenated selectively using palladium on charcoal with or without solvents such as methanol and hydrocarbons. The conditions are not critical. The use of 0.5%–5% catalyst (5% palladium on charcoal) in a temperature range of 50° C.–150° C. employing 100–600 lbs. hydrogen pressure results in hydrogenation of both olefinic double bonds. I prefer to hydrogenate the adduct in toluene as a solvent using 1% by weight of 5% palladium on charcoal catalyst at 100° C. under 200 lb. hydrogen pressure until no more hydrogen is absorbed and 2 moles of hydrogen being consumed for each mole of adduct.

The alternate method of preparing the saturated aldehyde involves the formation of an acetal before hydrogenation. An acetal of the myrcene-methacrolein adduct can be prepared by any of the general methods used for acetal formation from aldehydes. The ethylene glycol acetal is preferred because of its ease of formation. This acetal is prepared in the usual manner by reacting the myrcene-methacrolein adduct and ethylene glycol in a hydrocarbon solvent in the presence of an acidic catalyst. The reaction is conducted at reflux temperature and water is continuously removed from the distillate using a continuous water separator. The ethylene glycol acetal of myrcene-methacrolein adduct can be hydrogenated under various temperatures and pressures with or without a solvent with Raney nickel catalyst. It is preferred to hydrogenate the acetal in methanol at 20°–30° C. under 100–500 lb. hydrogen pressure using 6% by weight of Raney nickel catalyst. The hydrogenated acetal is hydrolyzed by an acid catalyst such as phosphoric, sulfuric, toluene sulfonic or oxalic acid. It was found that a mixture of oxalic and toluene sulfonic acid gave the best yield.

In general, the products of this invention find use in perfumery in mugwet compositions because of their spicy lily-like odors. Their unusual spicy flavor and odor make their use feasible where such flavor and odor are desirable.

The products of this invention can be used for compounding perfumes which will be used to scent soap, creams, toilet water, and alcoholic extracts.

1 - methyl - 4 - isohexylhexahydrobenzaldehyde and 1-methyl-3-isohexylhexahydrobenzaldehyde have a powerful flowery odor that lends itself to use in compounding such floral odors as violet, lily of the valley and rose in which use they exhibit a fixative as well as an enhancing value. In such floral compositions amounts of from 0.1% to 45% of the compound are employed.

1 - methyl - 4 - (4 - methyl - 3 - pentenyl) - 1,2,3,6-tetrahydrobenzaldehyde and 1 - methyl - 3 - (4 - methyl-3 - pentenyl) - 1,2,5,6 - tetrahydrobenzaldehyde have an odor which is similar to 1-methyl-4-isohexylhexahydrobenzaldehyde and 1-methyl-3-isohexylhexahydrobenzaldehyde but somewhat less smooth. They may be used in the same way as the saturated analog.

It is surprising that the products of this invention possess such desirable olfactory and flavor properties, in view of the facts that the corresponding myrcene-crotonaldehyde and myrcene-acrolein adducts do not have comparable properties.

In order further to illustrate my invention, the following examples are given:

EXAMPLE I

*Preparation of 1-methyl-4-(4-methyl-3-pentenyl)-1,2,3,6-tetrahydrobenzaldehyde and 1-methyl-3-(4-methyl-3-pentenyl)-1,2,5,6-tetrahydrobenzaldehyde*

Into a two liter, three neck flask fitted with a mechanical stirrer, thermometer and a reflux condenser equipped with a water separator, was placed 680 g. of myrcene No. 85 (the Glidden Co.), 350 g. of methacrolein and 0.5 g. of hydroquinone. The contents of the flask were brought to a reflux and refluxed 30 hours. At the beginning of the reflux period a small amount (6.0 g.) of constant boiling water-methacrolein mixture collected in the water separator and is withdrawn. The temperature in the flask gradually increased from 90° C. to 140° C. over the 30 hour period. The heating was discontinued when the temperature reached 140° C., whereupon the batch was cooled to room temperature. Nine hundred ninety-six (996) g. of crude adduct were obtained and 20 g. of methacrolein was recovered from the water separator.

The crude adduct was vacuum distilled using a 24" column packed with glass helices and divided into the following fractions: (1) 5 g. B. P. 30–32° C./81 mm. (2) 256 g. B. P. 38–40° C./5 mm. (3) 13 g. B. P. 40–100° C./2 mm. (4) 658 g. B. P. 100–107° C./2 mm. and (5) 64 g. residue. Fraction No. 1 was methacrolein, fraction No. 2 was recovered myrcene, fraction No. 3 was myrcene-methacrolein adduct fraction valued at 75% adduct and fraction No. 4 is myrcene-methacrolein adduct analyzing 98.1%, sp. gr. 25° C./25° C. 0.9198, $N_D^{20}$ 1.4850. The weight yield was 157.5% on myrcene consumed or 205.5% on methacrolein consumed.

EXAMPLE II

*Preparation 1-methyl-4-isohexylhexahydrobenzaldehyde and 1-methyl-3-isohexylhexahydrobenzaldehyde*

Five hundred (500) g. of myrcene-methacrolein adduct, 500 g. of toluene and 5 g. of palladium (5% charcoal) catalyst were placed in a 2 liter steel rocking autoclave (American Instrument Co.). The charge was hydrogenated by introducing hydrogen to 200 lbs. pressure and raising the temperature to 100° C. The hydrogenation was continued at 100° C. and 200 lbs. hydrogen pressure until no more hydrogen was absorbed as indicated by no further pressure drop in the autoclave. The hydrogenation required 30 hours and 4.82 moles of hydrogen were required. The batch was allowed to cool and was filtered to remove the catalyst. The toluene solution was distilled at atmospheric pressure to remove toluene yielding a still residue of 500 g. of crude product.

The crude was vacuum distilled using a 21" column packed with glass helices. The following fractions were collected: (1) 35 g. B. P. 82–101° C./1–2 mm. (2) 415 g. B. P. 101–103° C./1–2 mm. (3) 40 g. B. P. 103–104° C./1–2 mm. (4) 2.5 g. residue. Fractions 1 and 3 were redistilled and gave 63 g. B. P. 101–103° C./1–2 mm. which was combined with 415 g. of fraction 2 to give 478 g. of the aldehyde analyzing; purity 98.5% (carbonyl value 262.4), sp. gr. 25° C./25° C. 0.8892, $N_D^{20}$ 1.4648. The yield was 95.6% by weight of the myrcene-methacrolein adduct.

EXAMPLE III

*Preparation 1-methyl-4-isohexylhexahydrobenzaldehyde and 1-methyl-3-isohexylhexahydrobenzaldehyde*

(A) Preparation of 1-methyl-4-(4-methyl-3-pentenyl)-1,2,3,6-tetrahydrobenzaldehyde ethylene glycol acetal and 1-methyl-3-(4-methyl-3-pentenyl)-1,2,5,6-tetrahydrobenzaldehyde ethylene glycol acetal.

There was placed into a one liter, three neck flask fitted with a mechanical stirrer, a thermometer, and a reflux condenser equipped with a continuous water separator, 150 g. of myrcene-methacrolein adduct (Example I), 62 g. of ethylene glycol, 1 g. of toluene sulfonic acid and 200 g. of benzene. The mixture was brought to a reflux and agitated and refluxed while continuously removing the water of the reaction as formed by separating it out of the distillate. The refluxing was continued until no more water was removed from the reaction requiring 2¾ hours, 14.5 g. of water was separated.

The batch was cooled and 20 g. of 10% aqueous NaHCO$_3$ was added. The batch was agitated for 10 minutes and allowed to settle. The bottom layer was withdrawn and discarded. The benzene solution was washed with 50 g. of water and after separation of the water wash was distilled under reduced pressure to remove the benzene. The crude acetal weighing 193 g. remained as distillation residue.

The crude acetal was vacuum distilled using a 12" column packed with glass helices and gave 4 g. of fractions B. P. 112–140° C./4 mm. $N_D^{20}$ 1.4891, 168 g. of acetal B. P. 140–144° C./4 mm. $N_D^{20}$ 1.4919 and 6.0 g. of residue. The acetal analyzed 76.3% carbon and 11.7% hydrogen. The weight yield was 112.0% on the myrcene-methacrolein adduct.

(B) Preparation of 1-methyl-4-isohexylhexahydrobenzaldehyde ethylene glycol acetal and 1-methyl-3-isohexylhexadrobenzaldehyde ethylene glycol acetal.

One hundred sixty-eight (168) g. of the acetal prepared above, 200 g. of dry methanol, 10 g. of Raney nickel catalyst and 2 g. of sodium carbonate were placed into a 1.5 liter steel rocking autoclave (American Instrument Co.). The charge was hydrogenated by introducing hydrogen to 500 lb. pressure and agitating at 23° C. and 500 lb. pressure for 6 hours. Two moles of hydrogen were absorbed for each mole of the acetal charged. The catalyst was removed from the charge by filtration and the methanol was removed by distillation at atmospheric pressure leaving a residue of 163 g. of the crude hydrogenated acetal. The crude acetal was vacuum distilled using a 12" column packed with glass helices and gave 2 g. of fractions B. P. 115–129° C./3 mm., 154 g. B. P. 130°–132° C./3 mm. of the acetal (analyzing $N_D^{20}$ 1.4776, 75.5% C. and 11.9% H$_2$) and 1.0 g. of residue. The weight yield was 91.7% calculated on the unsaturated acetal.

(C) Preparation of 1-methyl-4-isohexylhexahydrobenzaldehyde and 1-methyl-3-isohexylhexahydrobenzaldehyde.

Fifty grams (50 g.) of the hydrogenated acetal prepared above in B was placed in a flask with 20 g. of oxalic acid and 1 g. of toluene sulfonic acid. The acetal was hydrolyzed and steamed distilled by passing in live steam through the reaction mixture. The oil-water distillate has collected until no further oil was found in the distillate. The oil layer was separated from the distillate and amounted to 40 g. of crude aldehyde. The crude was vacuum distilled through a 12" column packed with glass helices. There was obtained 30 g. of aldehyde B. P. 112–118° C./3 mm. and 4 g. of recovered acetal B. P. 130–132° C./3 mm. $N_D^{20}$ 1.4760. The aldehyde analyzed, purity 86.9%, sp. gr. 25° C./25° C. 0.9094 $N_D^{20}$ 1.4716. Iodine value 0. The weight yield was 65.2% on the hydrogenated acetal.

EXAMPLE IV

A violet scented toilet water base containing 1-methyl-4-isohexylhexahydrobenzaldehyde and 1-methyl-3-isohexylhexahydrobenzaldehyde having the following composition was made:

| | |
|---|---|
| 1-methyl-4-isohexylhexahydrobenzaldehyde | 231.0 |
| 1-methyl-3-isohexylhexahydrobenzaldehyde | |
| Ionone | 346.0 |
| Benzyl acetate 100% | 144.0 |
| p-Methoxyacetophenone | 58.5 |
| Methyl 2-octynoate (10% in diethyl phthalate) | 11.6 |
| Diphenylmethane | 17.5 |
| Benzaldehyde (10% in diethyl phthalate) | 11.6 |
| Terpineol extra | 58.0 |
| Cedrenol | 29.0 |
| Labdanum soluble resin | 29.0 |
| Isobutyl undecylenate | 29.0 |
| Vanillin (10% in diethyl phthalate) | 5.8 |
| Lauraldehyde (10% in diethyl phthalate) | 2.9 |
| Isobornyl acetate | 8.7 |
| Pimento berry oil (10% in diethyl phthalate) | 5.8 |
| Ethyl salicylate | 2.9 |
| Olibanum soluble resin | 5.8 |
| p-Tolylacetaldehyde (10% in diethyl phthalate) | 2.9 |
| | 1000.0 |

This composition is an oily amber colored liquid with a specific gravity of 0.9663, a refractive index of: 1.4956, a carbonyl value of 175.6 and a saponification value of 112.4.

A toilet water was prepared by dissolving 2 parts of the composition in 98 parts by weight of 70% specially denatured alcohol (No. 39.C.). The solution was permitted to age for seven days and then it was chilled to 5° C. and filtered.

The toilet water has a strong flowery odor which is long lasting. This is unusual for a composition which contains no natural flower oils to give it strength, floweriness and persistence of odor.

An example of the compound used in a floral bouquet composition which is suitable as a perfume for toilet soap is as follows:

FLORAL BOUQUET

| | |
|---|---|
| Phenylethyl alcohol | 330.0 |
| Terpineol prime | 387.0 |
| 1-methyl-4-isohexylhexahydrobenzaldehyde | 140.0 |
| 1-methyl-3-isohexylhexahydrobenzaldehyde | |
| Benzyl acetate | 55.0 |
| Bois de rose oil | 27.5 |
| 2-methoxynaphthalene | 2.7 |
| p-Methylacetophenone | 8.2 |
| Petitgrain oil | 2.7 |
| Diphenylmethane | 5.5 |
| Methyl cinnamate | 11.0 |
| Methyl Ionone (10% in diethyl phthalate) | 13.9 |
| Opoponox soluble resin (10% in diethyl phthalate) | 5.5 |
| Benzaldehyde (10% in diethyl phthalate) | 11.0 |
| | 1000.0 |

Soap cakes were made by adding 1 g. of this composition to 100 g. of unperfumed white No. 1 soap flakes, milling this with 15 g. of distilled water in a porcelain mortar until the ingredients were intimately combined. The mass of perfumed soap was then formed into cakes by pressing it in a tabletting die.

The soap cakes possessed a strong fragrant odor which remained stable during 5 months' exposure to daylight and air, indoors. This is unusual for a soap perfume containing only 3.57% of natural essential oils and gums in its composition, inasmuch as those skilled in the art recognize that from 4 to 10 times as much natural materials are usually required in a perfume composition for it to possess such properties. On the other hand, with increasing shortages of natural perfuming materials, the ability to make satsifactory perfumes with a minimum use of natural materials is highly desirable.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

I claim:

1. A Diels-Alder adduct of myrcene and methacrolein, said adduct having desirable olfactory and flavor properties.

2. A hydrogenated aldehydic Diels-Alder adduct of myrcene and methacrolein, said aldehyde having desirable olfactory and flavor properties.

3. The process for making a material having desirable olfactory and flavor characteristics, which comprises effecting a Diels-Alder reaction with myrcene and methacrolein.

4. The process of claim 3, wherein the resulting adduct is hydrogenated to form a fully saturated aldehyde.

5. The process of claim 3, wherein the resulting adduct is reacted with an alcohol to form an acetal, the latter is then hydrogenated to form a fully saturated acetal, and the latter is hydrolyzed to yield a fully saturated aldehyde.

References Cited in the file of this patent

UNITED STATES PATENTS 1,944,732   Diels et al. _____ Jan. 23, 1934